United States Patent [19]
Peters et al.

[11] Patent Number: 4,647,399
[45] Date of Patent: Mar. 3, 1987

[54] PROCESS FOR PRODUCING CE-MN COACTIVATED FLUOROAPATITE PHOSPHORS AS THE YELLOW EMITTING COMPONENT FOR HIGH EFFICACY LAMP BLENDS

[75] Inventors: Thomas E. Peters, Chelmsford; Romano G. Pappalardo, Sudbury, both of Mass.

[73] Assignee: GTE Laboratories Incorporated, Waltham, Mass.

[21] Appl. No.: 859,846

[22] Filed: Apr. 30, 1986

Related U.S. Application Data

[63] Continuation of Ser. No. 467,674, Feb. 18, 1983, abandoned, which is a continuation-in-part of Ser. No. 373,384, Apr. 30, 1982, abandoned.

[51] Int. Cl.$^4$ .................................. C09K 11/463
[52] U.S. Cl. ..................... 252/301.4 P; 313/486; 252/301.4 H
[58] Field of Search ............. 252/301.4 P, 301.4 H; 313/486

[56] References Cited

U.S. PATENT DOCUMENTS 2,306,567 12/1942 Roberts ................. 252/301.4 P
3,014,874 12/1961 Ranby .................. 252/301.4 P
3,525,698 8/1970 Leto et al. ............. 252/301.4 P

OTHER PUBLICATIONS

Henderson et al., "J. of the Electrochem. Soc.", vol. 104, No. 10, 1957, pp. 612–615.

*Primary Examiner*—Jack Cooper
*Attorney, Agent, or Firm*—Ivan L. Ericson

[57] ABSTRACT

Yellow emitting fluorescent lamp phosphor compositions comprise cerium and manganese activated alkali-earth fluoroapatite compositions containing sodium having the approximate formula

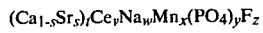
$$(Ca_{1-s}Sr_s)_t Ce_v Na_w Mn_x (PO_4)_y F_z$$

wherein
s is from 0 to 1
t is from about 3.43 to about 4.01
v is about 0.3
w is about 0.3
x is from about 0.3 to about 0.4
y is about 3.00
z is from about 1.0 to about 4.0.

An improved two step firing process for producing the disclosed phosphors is described and an improved fluorescent lamp employing the disclosed phosphors is also described.

2 Claims, 8 Drawing Figures

PROCESS FOR PRODUCING CE-MN COACTIVATED FLUOROAPATITE PHOSPHORS AS THE YELLOW EMITTING COMPONENT FOR HIGH EFFICACY LAMP BLENDS

CROSS REFERENCE TO RELATED APPLICATION

This is a continuation of co-pending application Ser. No. 467,674 filed on Feb. 18, 1983 which is a continuation in part of Ser. No. 373,384 filed Apr. 30, 1982, both now abandoned. A co-pending patent application Ser. No. 373,330 filed Apr. 30, 1982, entitled "YELLOW EMITTING PHOSPHORS, PROCESS FOR PRODUCING SAME, AND A FLUORESCENT LAMP CONTAINING SAME" by Romano G. Pappalardo AND John Walsh, and assigned to GTE Laboratories Incorporated, assignee of this application, concerns related subject matter of this application.

FIELD OF THE INVENTION

This invention relates to alkaline earth fluoroapatite luminescent materials. More particularly, it relates to calcium-strontium fluoroapatite phosphors activated with cerium and manganese and to fluorescent lamps incorporating these phosphor materials.

BACKGROUND OF THE INVENTION

British Pat. No. 792,598 to Ranby and corresponding *J. Electrochemical Soc.*, Vol. 104, No. 10 (October 1957)pp. 612–615, article entitled "Cerium-Activated Halophosphate Phosphors" by S. T. Henderson and P. W. Ranby disclose a luminescent material comprising a halophosphate of calcium and/or strontium, having an apatite structure activated with cerium or with cerium and manganese, containing sodium.

SUMMARY OF THE INVENTION

In accordance with one aspect of the present invention, there is provided an improved luminescent composition comprising a cerium and manganese activated calcium-strontium fluoroapatite composition containing sodium having the approximate formula

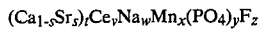
$(Ca_{1-s}Sr_s)_t Ce_v Na_w Mn_x (PO_4)_y F_z$ wherein
s is from 0 to 1
t is from 3.43 to about 4.01
v is about 0.3
w is about 0.3
x is from about 0.3 to about 0.4
y is about 3.0
z is from about 1.0 to about 4.0.

In another aspect of the invention, a fluorescent lamp comprising a light-transmitting envelope has electrodes, an inert ionizable gas and a charge of mercury therein and a coating of phosphor on the inside surface of the envelope. The phosphor comprises a cerium and manganese activated calcium-strontium fluoroapatite composition containing sodium having the approximate formula

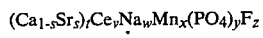
$(Ca_{1-s}Sr_s)_t Ce_v Na_w Mn_x (PO_4)_y F_z$ wherein
s is from 0 to 1
t is from 3.43 to about 4.01
v is about 0.3
w is about 0.3
x is from about 0.3 to about 0.4
y is about 3.0
z is from about 1.0 to about 4.0.

In still another aspect of the invention, a process for producing cerium and manganese activated calcium-strontium fluoroapatite luminescent material composition containing sodium comprises comminuting the material composition to form a thoroughly mixed powder blend. The powder blend is then fired for about 1 to about 1.5 hours at about 900° C. to about 1050° C. in about 1.0 l/minute flow of $N_2$ containing 5% $H_2$ and a small amount of water vapor. The fired blend is then cooled to about 700° C. in about 2 hours and further cooled to about 25° C. The cooled fired blend is then milled into a fine powder.

For a better understanding of the present invention; together with other and further objects, advantages and capabilities thereof, reference is made to the following disclosure and appended claims in connection with the above-described drawings.

DETAILED DESCRIPTION OF THE PREFERRED EMBODIMENT

Figure 1:
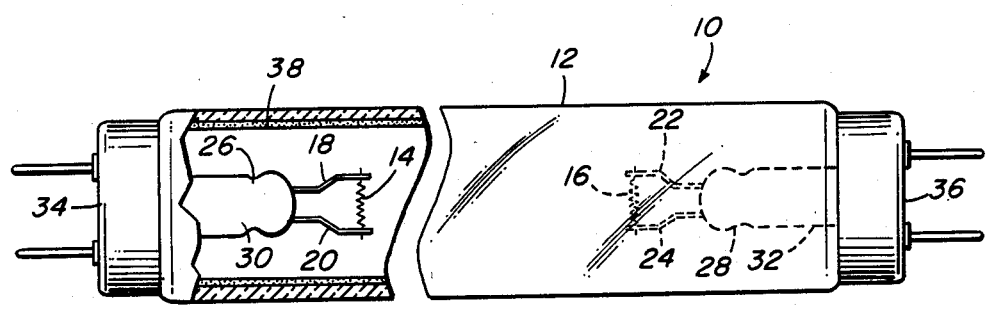
FIG. 1 is a view of a fluorescent lamp, partially in section, diagrammatically illustrating an embodiment of the invention.

Referring now to the drawings with greater particularity, there is shown in FIG. 1 a fluorescent lamp 10. Lamp 10 comprises an elongated sealed glass envelope 12 of circular cross section. It has the usual electrodes 14 and 16 at each end supported by lead-in wires 18, 20 and 22, 24, respectively, which extend through glass presses 26, 28 in mount stems 30, 32 to the contacts in bases 34, 36 affixed to the ends of the lamp 10.

Envelope 12 is filled with an inert gas such as argon or a mixture of argon and neon at a low pressure, for example, two torr, and a small quantity of mercury, at least enough to provide a low vapor pressure of about six microns during operation.

The interior of envelope 12 is coated with a layer of phosphor 38 of the present invention.

A phosphor coating suspension was prepared by dispersing the phosphor particles in a water base system employing polyethylene oxide as the binder with water as the solvent.

The phosphor suspension was applied in the usual manner of causing the suspension to flow down the inner surface of envelope 12 and allowing the water to evaporate, leaving the binder and phosphor particles adhered to the envelope 12 wall. The phosphor coated envelope 12 was then heated in an oven to volatilize the organic components, the phosphor layer 38 remaining on the envelope 12 wall.

Envelope 12 is processed into a fluorescent lamp by conventional lamp manufacturing techniques.

Higher values of the efficacy (lumens per watt) have been obtained in low pressure fluorescent lamps by using a combination of two phosphors, namely, a narrow band, blue emitting phosphor, specifically, a europium activated strontium chloroapatite phosphor and a narrow band, yellow emitting phosphor based on an antimony and manganese activated calcium fluoroapatite phosphor. It is the purpose of the present invention to make a narrow band, yellow emitting phosphor that may be used instead of an antimony and manganese activated calcium fluoroapatite Sylvania type 4381 phosphor (henceforth designated as type 4381) in high efficacy, two component lamp blends. These phosphors are based on the alkali-earth fluoroapatites (with the alkali-earth being Ca, Sr or a combination of the two) and contain as activators Ce and Mn. In these phosphors, Mn provides the needed narrow band yellow emission, while Ce is used to sensitize the Mn emission. A co-pending patent application, Ser. No. 373,330, covers similar materials formulated with excess fluoride. The materials of this invention are formulated with both fluoride excess and compensation of the trivalent cation $Ce^{3+}$ by sodium. A formulation approaching optimum light output, for the use in high efficacy lamps, was found initially to be:

$$Me_{4.0005}Ce_{0.3}Na_{0.3}Mn_{0.3}(PO_4)_3F_2$$

(where Me equals Ca, Sr and combinations thereof).

The formulations used in the preparation of the phosphors of the present invention are different from those expected to yield a stoichiometric apatite. In particular, these formulations are cation deficient and require an excess of halide relative to a stoichiometric apatite formulation. Nevertheless, X-ray powder diffractometry shows that these formulations do yield, after firing, apatite as the only detectably phase. It is believed, therefore, that the stoichiometric imbalance is corrected during the phosphor-forming heat treatment either through vaporization losses or through the formation of a second glassy phase. Moreover, it has been found that preparation of the most efficient phosphors requires a formulation providing both a fluoride excess and compensation of the trivalent $Ce^{3+}$ by a monovalent ion such as $Na^+$. Fluoride formulations ranged from 1 to 4 moles of F per 3.0 moles of $(PO_4)$. The optimum fluoride formulation was found to be 2 moles F per 3.0 moles of $(PO_4)$.

The phosphors of the present invention were prepared by milling together the luminescent grade reagents that are identified as to type and quantity in Examples 1 through 6 and Examples 7 through 10. After the reagents were thoroughly mixed, the resulting powder blend was placed in an alumina tray that was covered and heated to 1025° C. in a stream of 95/5 (% vol) $N_2/H_2$. Before passing into the furnace, the $N_2$—$H_2$ gas mixture was bubbled through a water bath maintained at a temperature of $\simeq 21°$ C. The presence of a small amount of water vapor in the gas stream was found to be necessary to the consistent preparation of phosphors with white body color. The tray containing the phosphor blend was held at 1025° C. for about 1 hour and was then allowed to furnace-cool to about 700° C. in 2 hours before moving it into the furnace vestibule area where it cooled to room temperature. After cooling, the phosphor is in the form of a soft cake that is easily milled into a fine powder for subsequent use.

EXAMPLE 1

Formulation $Ca_{4.0005}Ce_{0.3}Na_{0.3}Mn_{0.3}(PO_4)_3F_2$

Reagent Blend
$CaHPO_4$: 8.16 grams
$CaCO_3$: 0.01 grams
$CaF_2$: 1.56 grams
$CeO_2$: 1.03 grams
$MnCO_3$: 0.69 grams
$Na_2CO_3$: 0.32

EXAMPLE 2

Formulation $Ca_{3.955}Ce_{0.3}Na_{0.3}Mn_{0.35}(PO_4)_3F_2$

Reagent Blend
$CaHPO_4$: 8.15 grams
$CaCO_3$: 0.81 grams
$CaF_2$: 0.86 grams
$CeF_3$: 1.18 grams
$MnCO_3$: 0.80 grams
$Na_2CO_3$: 0.32 grams

EXAMPLE 3

Formulation $Sr_{3.905}Ce_{0.3}Na_{0.3}Mn_{0.4}(PO_4)_3F_2$

Reagent Blend
$CaHPO_4$: 8.16 grams
$CaCO_3$: 0.71 grams
$CaF_2$: 0.86 grams
$CeF_3$: 1.18 grams
$MnCO_3$: 0.92 grams
$Na_2CO_3$: 0.32 grams

EXAMPLE 4

Formulation $Sr_{3.955}Ce_{0.3}Na_{0.3}Mn_{0.35}(PO_4)_3F_2$

Reagent Blend
$SrHPO_4$: 8.26 grams
$SrCO_3$: 0.90 grams
$SrF_2$: 1.04 grams
$CeF_3$: 0.89 grams
$MnCO_3$: 0.60 grams
$Na_2CO_3$: 0.24 grams

EXAMPLE 5

Formulation $Sr_{3.905}Ce_{0.3}Na_{0.3}Mn_{0.4}(PO_4)_3F_2$

Reagent Blend
$SrHPO_4$: 8.26 grams
$SrCO_3$: 0.79 grams
$SrF_2$: 1.04 grams
$CeF_3$: 0.89 grams
$MnCO_3$: 0.69 grams
$Na_2CO_3$: 0.24 grams

EXAMPLE 6

Formulation $Ca_{3.435}Sr_{0.57}Ce_{0.3}Na_{0.3}Mn_{0.3}(PO_4)_3F_2$

Reagent Blend
$CaHPO_4$: 6.994 grams
$SrHPO_4$: 1.579 grams
$CaCO_3$: 0.009 grams
$SrCO_3$: 0.002 grams
$CeO_2$: 1.033 grams
$MnCO_3$: 0.690 grams
$Na_2CO_3$: 0.318 grams
$CaF_2$: 1.343 grams SrF$_2$: 0.352 grams

SPECTRAL PROPERTIES OF THE PHOSPHOR

Emission Spectra

Figure 2:
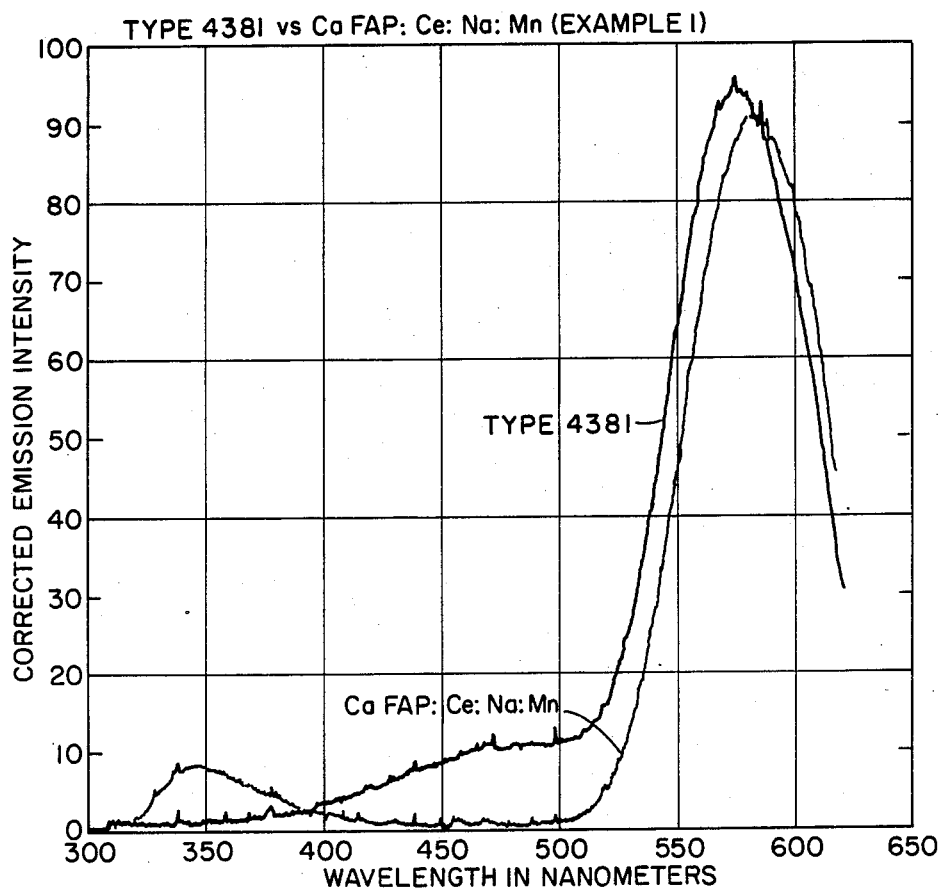
FIGS. 2 through 6 are the emission spectrum for a number of the phosphor compositions in accordance with the present invention and the emission spectrum of a type 4381 standard phosphor compared with each.

Ca-fluoroapatites—The corrected emission spectra of FIG. 2 are plotted for the type 4381 phosphor and for a sample from Example 1 of formulation $$Ca_{4.005}Ce_{0.3}Na_{0.3}Mn_{0.3}(PO_4)_3F_2.$$

The excitation wavelength was 254 nm and the ordinates in FIG. 2 and in the following figures are proportional to photons/nm. The corrected emission spectra are truncated at ≃615 nm because of instrumental limitations. Even so, the main features of the phosphor emission are easily apparent from an inspection of the following figures.

Figure 3:
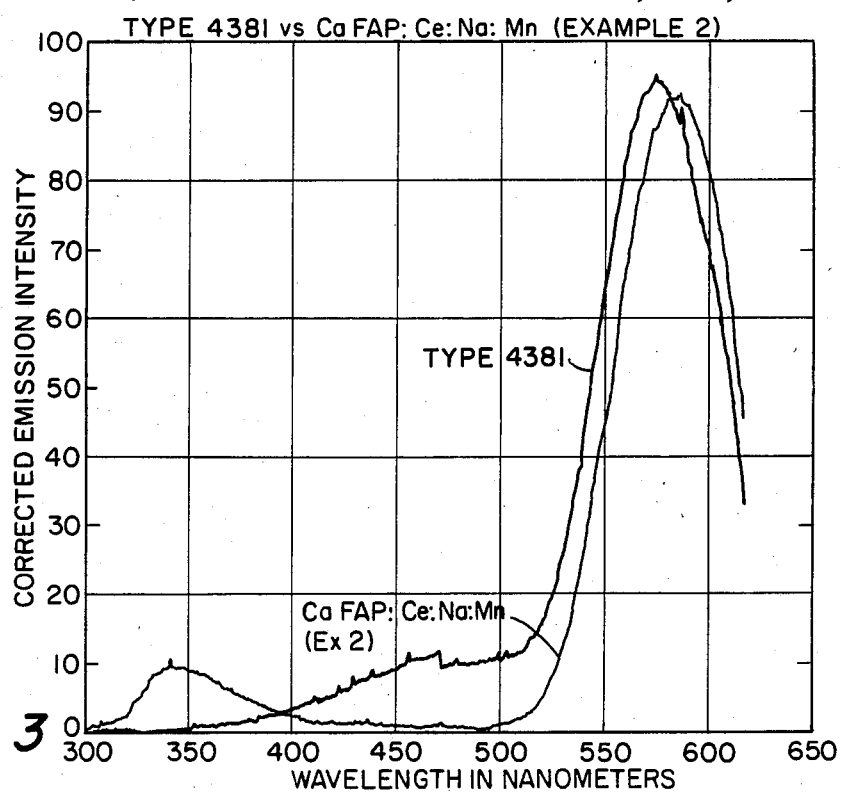

The emission from type 4381 is a composite of Mn$^{2+}$ and Sb$^{3+}$ bands, the latter extending from ≃400 nm to a peak of ≃500 nm and then merging with the Mn$^{2+}$ emission with peak at 575 nm. The emission from Example 1 consists of a weak band in the long uv with peak at ≃348 nm of peak intensity ≃1/10 that of the yellow emission from Mn$^{2+}$. The emission band from Mn$^{2+}$ peaks at 581 nm and is slightly shifted (5–6 nm) to longer wavelengths with respect to the corresponding band from type 4381. Peak emission intensity is 96% to 97% that of "Yellow Halo" (FIG. 2). A slightly higher peak (≃97% of type 4381) is shown in FIG. 3 for a sample from Example 2 with formulation $$Ca_{3.955}Ce_{0.3}Na_{0.3}Mn_{0.35}(PO_4)_3F_2.$$

Figure 4:
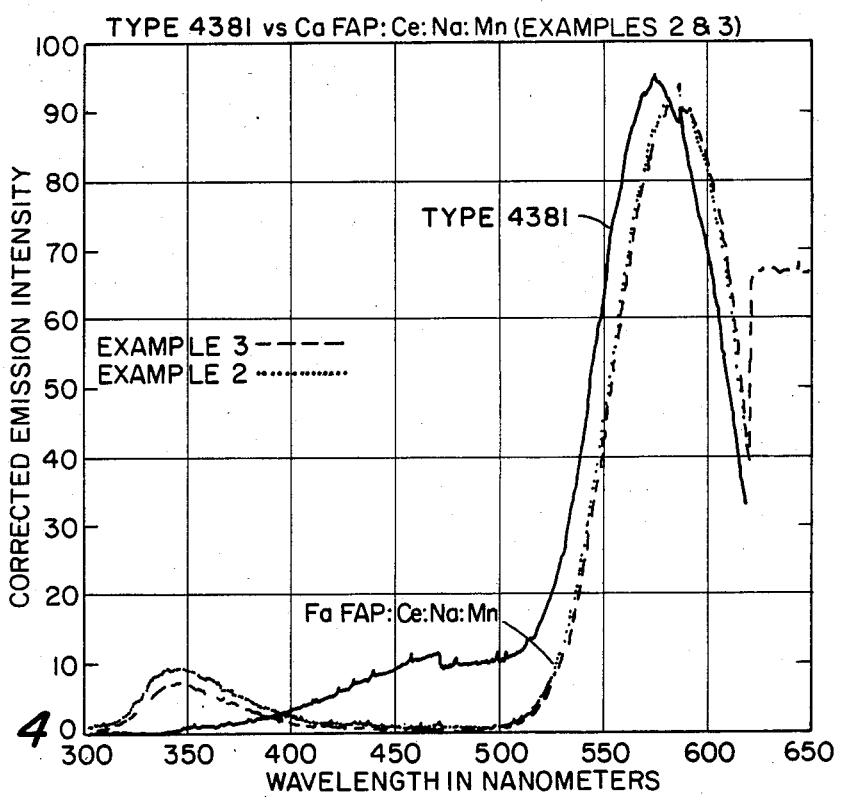

A further increase in Mn content very slightly shifts the emission band to longer wavelengths, but it does not increase the peak intensity. This is shown in FIG. 4 for a sample from Example 3 with formulation $$Ca_{3.905}Ce_{0.3}Na_{0.3}Mn_{0.4}(PO_4)_3F_2.$$

The increased Mn content further quenches the Ce emission without contributing to visible emission.

Figure 5:
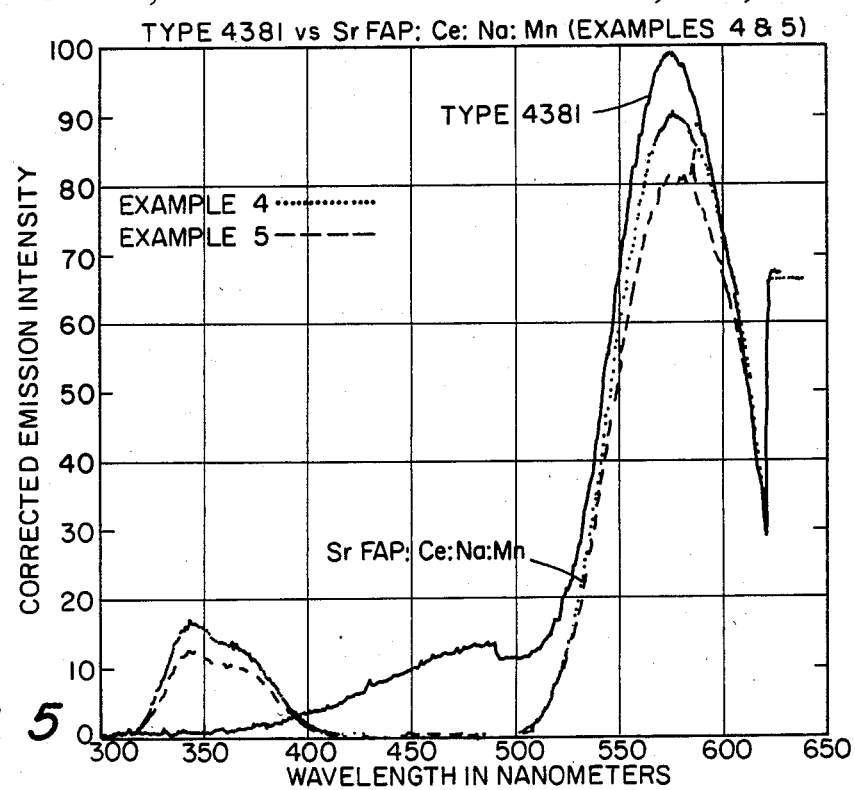

Sr-fluoroapatites—The optimum Mn content for highest peak intensity exceeds that for the case of the Ca fluoroapatites. This is evident from inspection of FIG. 5 where the emission spectra of samples from Examples 4 and 5 are plotted. The Ce emission has a doublet structure and is relatively more intense than the corresponding emission of the Ca fluoroapatite analogs. The Mn emission in the Sr fluoroapatites matches very closely in band position and width with that of type 4381. Relative peak height, relative to the former, was 91%, the highest value to date, and 82% for the samples of FIG. 5 with respective formulations $$Sr_{3.955}Ce_{0.3}Na_{0.3}Mn_{0.35}(PO_4)_3F_2 \text{ (Example 4)}$$

and $$Sr_{3.905}Ce_{0.3}Na_{0.3}Mn_{0.4}(PO_4)_3F_2 \text{ (Example 5)}.$$

Figure 6:
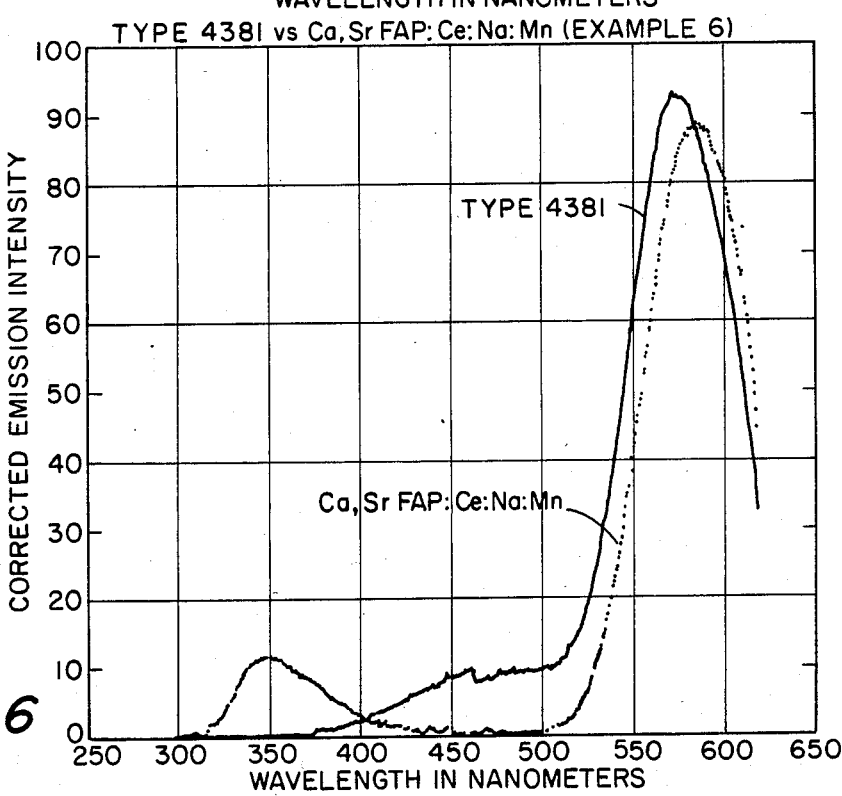

Mixed Ca-Sr fluoroapatites—The emission spectra of a mixed Ca-Sr fluoroapatite is shown in FIG. 6. The emission band of Example 6 with formulation $$Ca_{3.435}Sr_{0.57}Ce_{0.3}Na_{0.3}Mn_{0.3}(PO_4)_3F_2$$

peaks at ≃585 nm and has a height of ≃94% relative to type 4381. Increase in Sr content moves the yellow emission peak further to longer wavelengths.

Excitation Spectra

Figure 7:
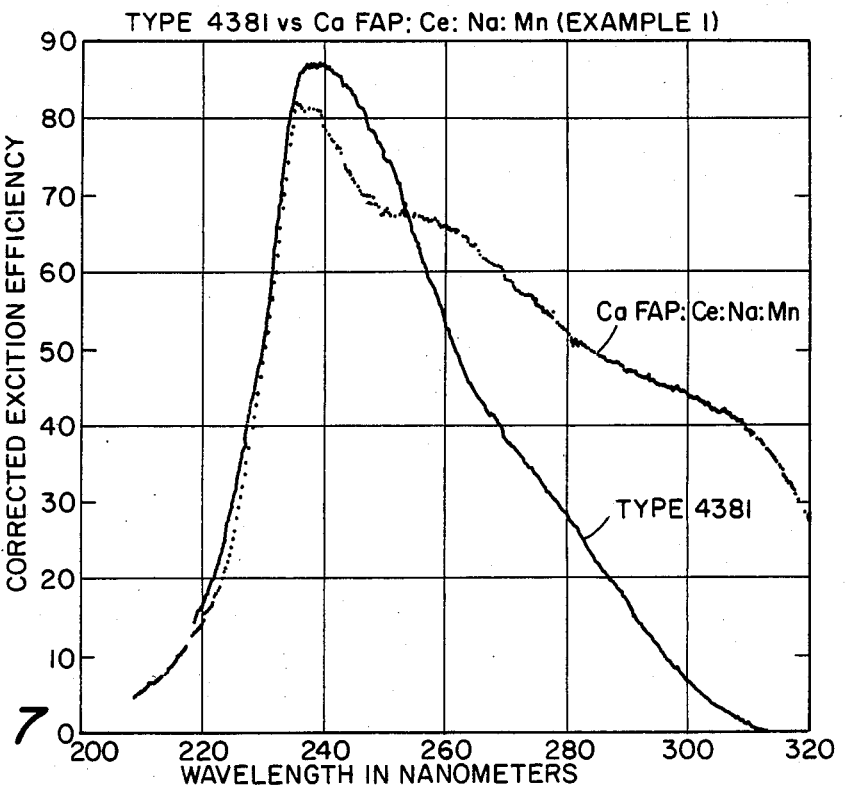
FIGS. 7 and 8 are the excitation spectrum for two of the phosphor compositions in accordance with the present invention and the excitation spectrum of a type 4381 standard phosphor compared with each.

The presence of Ce$^{3+}$ widens the spectral region that is accessible in the uv for absorption by the phosphor and subsequent conversion into visible light. This is shown in FIG. 7. The excitation region of type 4381 peaks sharply around 240 nm and then drops rapidly toward longer wavelengths.

Figure 8:
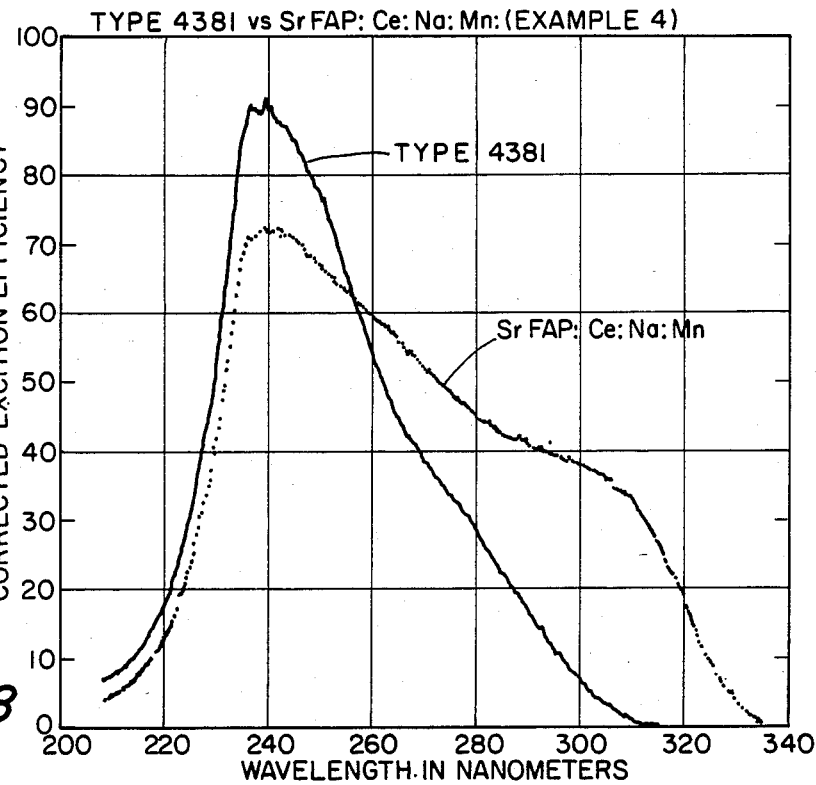

Type 4381 therefore absorbs poorly in the long uv and cannot convert the long wavelength emission components of the plasma. On the contrary, the excitation bands for the CaFAP phosphors of the present invention cover most of the uv region. This is evident in FIG. 7 for the case of sample from Example 1 with formulation $$Ca_{4.005}Ce_{0.3}Na_{0.3}Mn_{0.3}(PO_4)_3F_2$$

and for an analogous Sr fluoroapatite excitation spectrum shown in FIG. 8 and referring to Example 4 with formulation $$Sr_{3.955}Ce_{0.3}Na_{0.3}Mn_{0.35}(PO_4)_3F_2.$$

This wider spectral region for uv excitation is a potential advantage of the phosphors of the present invention over the commercially used type 4381.

Comparison of an Improved Phosphor of the Present Invention with that of the Prior Art The phosphor formulation of Example 6 was compared to that of the prior art teaching given in Example 9 of British Pat. No. 792,589 to Ranby. The respective formulations were:

Example 6 formulation of the present invention:

$$Ca_{3.435}Sr_{0.57}Ce_{0.3}Mn_{0.3}Na_{0.3}(PO_4)_3F_2$$

Ranby's formulation:

$$Ca_{3.83}Sr_{0.67}Ce_{0.19}Mn_{0.28}Na_{0.52}(PO_4)_3F_{1.34}Cl_{0.52}.$$

To insure that the comparison was as objective as possible, the following precautions were observed.

(1) Both of the test phosphors were prepared from the same high purity ingredients, except NaCl was used for Ranby's formulation, as stated in his patent, instead of Na$_2$CO$_3$.

(2) The firings were conducted in the same furnace, each under the specified conditions, using similar quantities of powder blend.

After firing each of the phosphors exhibited in a white body color and emitted in the yellow when excited by short uv radiation. However, a comparison of the emission intensities, as measured by the height of the emission band at 575 nm (254 nm excitation), showed the output of the phosphor made by Ranby's formulation to be only 75% of the output of the phosphor of the present invention.

Additional phosphor examples 7 through 10 of the present invention were prepared the same way as examples 1 through 6.

EXAMPLE 7

Formulation $Ca_{3.955}Ce_{0.3}Na_{0.3}Mn_{0.35}(PO_4)_3F$

Reagent Blend
$CaHPO_4$: 6.80 grams
$CaCO_3$: 1.91 grams
$CaF_2$: 0.78 grams
$CeO_2$: 1.03 grams
$MnCO_3$: 0.80 grams
$Na_2CO_3$: 0.32 grams
$(NH_4)_2HPO_4$: 1.32 grams

EXAMPLE 8

Formulation $Ca_{3.955}Ce_{0.3}Na_{0.3}Mn_{0.35}(PO_4)_3F_2$

Reagent Blend
$CaHPO_4$: 6.80 grams
$CaCO_3$: 0.91 grams
$CaF_2$: 1.56 grams
$CeO_2$: 1.03 grams
$MnCO_3$: 0.80 grams
$Na_2CO_3$: 0.32 grams
$(NH_4)_2HPO_4$: 1.32 grams

EXAMPLES 9

Formulation $Ca_{3.955}Ce_{0.3}Na_{0.3}Mn_{0.35}(PO_4)_3F_3$

Reagent Blend
$CaHPO_4$: 6.68 grams
$CaF_2$: 2.34 grams
$CeO_2$: 1.03 grams
$MnCO_3$: 0.80 grams
$Na_2CO_3$: 0.32 grams
$(NH_4)_2HPO_4$: 1.44 grams

EXAMPLE 10

Formulation $Ca_{3.955}Ce_{0.3}Na_{0.3}Mn_{0.35}(PO_4)_3F_4$

Reagent Blend
$CaHPO_4$: 5.32 grams
$CaF_2$: 3.12 grams
$CeO_2$: 1.03 grams
$MnCO_3$: 0.80 grams
$Na_2CO_3$: 0.32 grams
$(NH_4)_2HPO_4$: 2.76 grams The plaque brightness measurements of examples 7-10, compared to a CaFAP:56, Mn reference phosphor were:
77.5% for Example 7,
92.2% for Example 8,
100.5% for Example 9, and
101.0% for Example 10.

It was observed that the plaque brightness measurements show that the emission intensity increases monotonically with the fluoride content, reaching a maximum in materials formulated with F=4. The phosphors formulated with the higher fluoride contents (F=3 and 4); however, are not the preferred phosphors because the fired phosphor cake was very hard and not easily reduced to the powder form.

The first cooling step where the fired blend is cooled to about 700° C. in about 2 hours prevents green body color regions within the fired phosphor cake.

While there has been shown and described what is at present considered the preferred embodiment of the invention, it will be obvious to those skilled in the art that various changes and modifications may be made therein without departing from the scope of the invention as defined by the appended claims.

What is claimed is:

1. A process for producing cerium and manganese activated calcium-strontium fluoroapatite luminescent material composition containing sodium, comprising:

mixing a calcium source, a strontium source, a cerium source, a sodium source, a manganese source, a phosphate source, and a fluoride source together in amounts in accordance with the formula

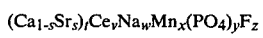

$$(Ca_{1-s}Sr_s)_tCe_vNa_wMn_x(PO_4)_yF_z$$

wherein
s is from 0 to 1
t is from about 3.43 to about 4.01
v is about 0.3
x is from about 0.3 to about 0.4
y is about 3.00
z is from 1.0 to about 4.0 to form a reagent mixture wherein
said calcium source is selected from the group consisting of calcium hydrogen phosphate, calcium carbonate, calcium fluoride, and mixtures thereof;
said strontium source is selected from the group consisting of strontium hydrogen phosphate, strontium carbonate, strontium fluoride, and mixtures thereof;
said cerium source is selected from the group consisting of cerium (IV) oxide, cerium (III) fluoride, and mixtures thereof;
said sodium source consists of sodium carbonate;
said manganese source consists of manganese (II) carbonate;
said phosphate source is selected from the group consisting of diammonium hydrogen phosphate, calcium hydrogen phosphate, strontium hydrogen phosphate, and mixtures thereof; and
said fluoride source is selected from the group consisting of calcium fluoride, strontium fluoride, cerium (III) fluoride, and mixtures thereof;
comminuting said reagent mixture to form a thoroughly mixed powder blend,
firing said blend for about 1 to about 1.5 hours at about 900° C. to about 1050° C. in about 1.0 l/minute flow of $N_2$ containing 5% $H_2$ and a small amount of water vapor;
cooling the fired blend to about 700° C. in about 2 hours;
further cooling the fired blend to about 25° C.; and
milling the cooled blend.

2. A process according to claim 1 wherein the $N_2$ containing 5% $H_2$ contains water vapor incorporated therein by bubbling it through water maintained at a temperature of 21° C.

* * * * *